United States Patent [19]

Van der Hoeven

[11] Patent Number: 4,953,812
[45] Date of Patent: Sep. 4, 1990

[54] AIRCRAFT CONFIGURATION WITH AFT MOUNTED ENGINES AND METHOD

[75] Inventor: Antonius J. Van der Hoeven, Issaquah, Wash.

[73] Assignee: The Boeing Company, Seattle, Wash.

[21] Appl. No.: 120,587

[22] Filed: Nov. 13, 1987

[51] Int. Cl.⁵ .......................................... B64D 27/20
[52] U.S. Cl. ...................................... 244/55; 244/130; 244/119; 244/120
[58] Field of Search ................. 244/12.3, 130, 69, 119, 244/129.1, 55, 65, 120, 57

[56] References Cited

U.S. PATENT DOCUMENTS

| | | | |
|---|---|---|---|
| 1,801,875 | 5/1930 | Melcher | 114/57 |
| 2,863,620 | 12/1958 | Vautier . | |
| 3,388,878 | 6/1968 | Peterson et al. . | |
| 3,592,415 | 7/1971 | Walley et al. | 244/55 |
| 4,311,289 | 1/1982 | Finch . | |
| 4,417,708 | 11/1983 | Negri . | |
| 4,447,022 | 5/1984 | Lion . | |
| 4,629,147 | 12/1986 | Johnson, Jr. et al. . | |
| 4,674,712 | 6/1987 | Whitener et al. | 244/119 |
| 4,712,751 | 12/1987 | Hirschel . | |

FOREIGN PATENT DOCUMENTS

| | | | |
|---|---|---|---|
| 278957 | 10/1930 | Italy | 244/119 |
| 2175652 | 12/1986 | United Kingdom | 244/69 |
| 2177989 | 2/1987 | United Kingdom . | |

Primary Examiner—Joseph F. Peters, Jr.
Assistant Examiner—Anne Sartelle
Attorney, Agent, or Firm—Hughes & Multer

[57] ABSTRACT

An aircraft with two aft mounted prop engines. The side surface portions at the rear portion of the fuselage adjacent to the propellers are contoured from a standard optimized configuration to alleviate adverse effects on the pressure distribution pattern on the surfaces adjacent to the propellers. This is accomplished by contouring the side surface portions at an inward and rearward slant in a forward region, while locating intermediate side surface regions more along a longitudinally aligned contour. The rear regions of the side surface portions slant rearwardly and inwardly to a closure location.

13 Claims, 3 Drawing Sheets

AIRCRAFT CONFIGURATION WITH AFT MOUNTED ENGINES AND METHOD

BACKGROUND OF THE INVENTION

1. Field of the Invention

The present invention relates to an aircraft configuration, and more particularly to an aircraft configuration where propellers are mounted adjacent to the fuselage of the aircraft.

2. Background Art

To optimize the airflow around the fuselage of an aircraft, it is desirable to contour the aft portion of the fuselage in a manner that the surface of the fuselage aft portion tapers inwardly with a desired aerodynamic contour to a closure location. A typical closure configuration is in the form of an ogive where the length to width ratio is about three-to-one, this representing an optimum balance between pressure drag and skin friction drag. However, when engines are mounted to the rear fuselage portion, the effect of these engines can be such to disturb the optimized pressure distribution pattern resulting from the flow over the fuselage aft portion. This can result in an accelerated growth in the boundary layer over the surface of the rear fuselage portion, so as to cause increased drag. This problem can be exacerbated when the engines have propellers. In general, the diameter of a propeller for an engine of a given horsepower would be greater than the diameter of a fan for a fan jet engine of the same horsepower. Further, with the fan of a fan jet engine being enclosed in a nacelle or shroud, the disturbance in the flow field adjacent the aft fuselage surface is reduced somewhat, in comparison with propellers. For these reasons, as well as others, it is important to consider the effect of rear engine mounting as it relates to optimized airflow over the aft portion of the fuselage, particularly where there is an unshrouded propeller.

A search of the patent literature has disclosed a number of U.S. Patents, these being the following.

U.S. Pat. No. 1,386,493 discloses an aircraft or dirigible having a cooling system for a motor that drives the propeller. Air is introduced into the nacelle and this passes over the radiator of the motor. The air then passes rearwardly out from the nacelle. For example, in FIG. 1 air is introduced through aperture "a" and into chamber "c" enclosing motor "d". The air then flows along passage "e" and exits through the aperture "f". Also, air is inducted through the aperture "h", passes across the radiator "i" and is expelled through the aperture "j". In FIG. 1, the propeller is mounted at the rear of the aircraft. Other configurations show the propeller mounted at the forward end of the aircraft.

U.S. Pat. No. 2,385,499—Garvy discloses an aircraft having a propeller positioned at the forward end of the fuselage. The rear end of the fuselage has lateral portions which bulge outwardly. As shown in FIG. 7, when the airplane is turning so as to be in a yaw condition, the air flowing over the rearwardly positioned bulging portions on the fuselage acts in a manner to create a pressure differential along the opposite sides of the rear portion of the airplane, thus making it easier to turn the airplane.

U.S. Pat. No. 2,874,922—Whitcomb deals with the overall shaping of the airplane to reduce the effects of drag when the airplane approaches and exceeds the speed of sound. This relates to the well-known "area ruling" concept.

U.S. Pat. No. 2,956,760—Attinello discloses an airplane where the side portions of the fuselage have the capability of blowing air outwardly or sucking air inwardly. This is done to affect the local pressure along the fuselage, thus obtaining some of the aerodynamic benefits which might otherwise be obtained by modifying the actual contour of the fuselage.

U.S. Design Pat. No. 211,426—Smith discloses an aircraft configuration where the propeller is mounted rearwardly of the wing and is centered on the fuselage. At the location of the propeller, the diameter of the fuselage is made smaller than that of the main portion of the fuselage.

U.S. Pat. No. 3,455,523—Hertel discloses an aircraft where a cantilever support 2 is affixed to the rear end 7 of the fuselage 9. A plurality of jet engines are mounted to this cantilevered support member 2. This patent points out the difficulty of prior art configurations where the engines are mounted under the wing or laterally of the fuselage, in that the streams of air flowing along the engine and along the aircraft part on which they are mounted interfere with each other and cause an increased resistance and drag. The patent in column 1, beginning on line 64, discusses the invention disclosed therein as follows, "Due to the fact that the engines are carried by a rearwardly projecting spear-like support spaced from the fuselage, detrimental effects of the engine on the fuselage are avoided, and neither interference of airstreams, nor impingement of the walls of the fuselage by high pressure sonic waves takes place."

U.S. Pat. No. 3,476,336—Hertel relates to the contouring of a body, such as a fuselage of an aircraft, traveling at high subsonic speeds. The body has a transverse thickness gradually increasing from the nose of the body to an intermediate portion and gradually decreasing from the intermediate portion to the tail of the body. In FIGS. 15, 16 and 17, there is shown an arrangement somewhat similar to the earlier Hertel patent (U.S. Pat. No. 3,455,523), where a plurality of jet engines are mounted to a thin support 51 extending rearwardly from the fuselage.

SUMMARY OF THE INVENTION

The aircraft of the present invention comprises a fuselage having a longitudinal center axis, a forward portion, an intermediate main portion, and a rear portion. There are first and second engines mounted adjacent to an exterior surface of the rear portion. The engines have first and second propeller means at first and second propeller locations. The propeller means are arranged to rotate about first and second propeller axes, respectively, with each propeller axis having a substantial alignment component parallel to the longitudinal axis.

The fuselage rear portion has first and second longitudinally extending surface portions which extend lengthwise along the rear fuselage portions and which are adjacent to the first and second propeller means, respectively. Each surface portion has a longitudinally extending reference contour which represents an optimized contour to create an optimized pressure distribution pattern over said side surface portion under conditions where the propeller means are absent. The surface portions each also have an actual contour.

The fuselage rear portion is characterized in that with the first and second propeller means being positioned adjacent to the first and second surface portion and rotating so as to create thrusts, the pressure distribution pattern over the reference contours would be caused to depart from the optimized pressure distribution pattern in that pressure levels immediately forward of the location of the propeller means would be caused to be below pressure levels at corresponding locations on the optimized pressure distribution patterns on the reference contours.

The fuselage rear portion is further characterized in that the actual contour of each surface portion is such that surface locations at the actual contour are laterally spaced from corresponding surface locations on the reference surface contour in a manner to counteract adverse pressure effects of the propeller means and cause the pressure distribution pattern at the surface location at the actual contour to conform more closely to the optimized pressure distribution pattern.

The actual surface contour is characterized in that the forward region of each surface portion slants rearwardly and inwardly toward the longitudinal center axis at a relatively greater angle relative to the longitudinal axis and curves concavely to join its related intermediate region. Each intermediate region is more in alignment with the longitudinal center axis relative to its related forward surface region. Each intermediate region joins to its related rear region in a convex curve with each rear region slanting rearwardly and inwardly to a closure location.

The fuselage has a diameter dimension of an equivalent circle of a cross-sectional area of the fuselage. There is a diameter dimension ratio which is the ratio of an average diameter value which is an average of the diameter dimensions at forward and rear end portions of the intermediate section, to the diameter dimension at the rear end of the intermediate fuselage section. This diameter dimension ratio is broadly between about 0.4 and 0.9, with a preferred range being between about 0.5 and 0.8, and with the more preferred range being about 0.6 and 0.7.

In the preferred form the side surface portions at the intermediate section are substantially longitudinally aligned.

In the method of the present invention, there is first established longitudinally extending reference contours for each surface portion, where each contour creates an optimized pressure distribution pattern over the side surface portion under conditions where the propeller means are absent. Then modified pressure distribution patterns are identified over the surface portions. These modified pressure distribution patterns result from placing and operating the propeller means at the propeller locations to create thrust.

Then the side surface portions are recontoured from the reference contours to actual contours to create pressure effects which counteract adverse pressure effects created by the propellers being present so as to bring the pressure distribution pattern over the side surface portion more closely to the optimized pattern. The actual contours of the side surface portions are characterized in that the forward, intermediate and rear regions are contoured as described above.

Other features of the present invention will become apparent from the following detailed description.

BRIEF DESCRIPTION OF THE PREFERRED EMBODIMENT

It is believed that a clearer understanding of the present invention will be obtained by first discussing generally the flow patterns which occur in the aft section of a conventionally contoured fuselage. In general, an ogive aft body with a length-to-width ration of 3-to-1 is roughly an optimum balance between pressure drag and skin friction drag. Such a section is illustrated in side elevational view in FIG. 2, where there is shown in isobars a representation of the pressure gradient along the side surface of the aft portion of the fuselage. It can be seen that the pressure coefficient decreases gradually in a rearward direction to a value of approximately $-0.1$, and then increases toward a zero level at the rear portion of the aft fuselage portion. With this sort of pattern of pressure distribution, drag is maintained at a practical minimum, and the boundary layer adjacent the aft body surface is kept within reasonably small thickness dimensions.

Figure 1:
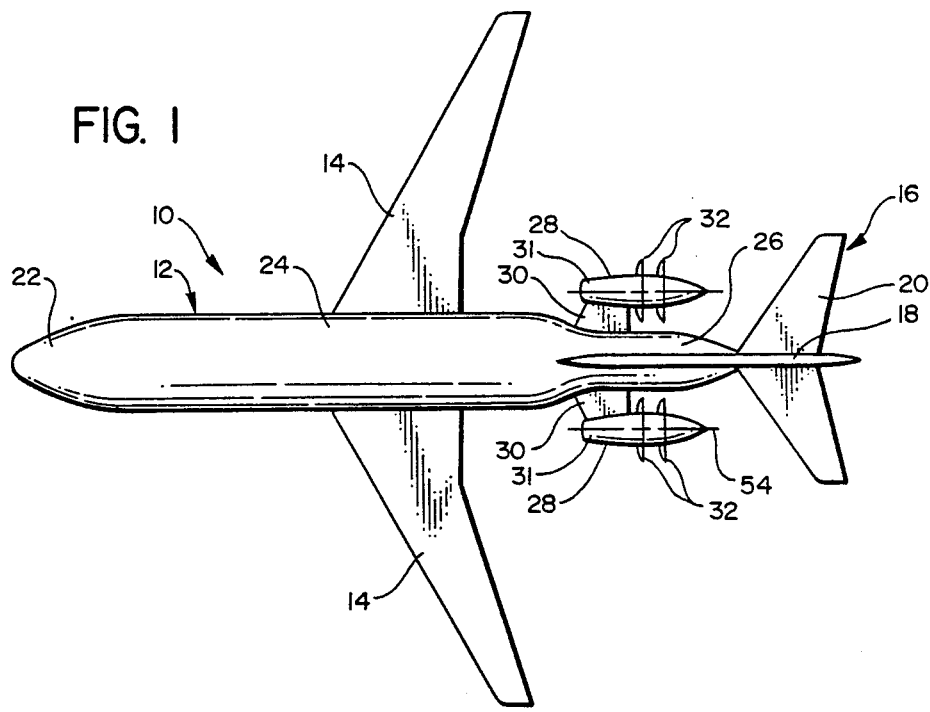
FIG. 1 is a top plan view of an aircraft incorporating teachings of the present invention.
Figure 2:
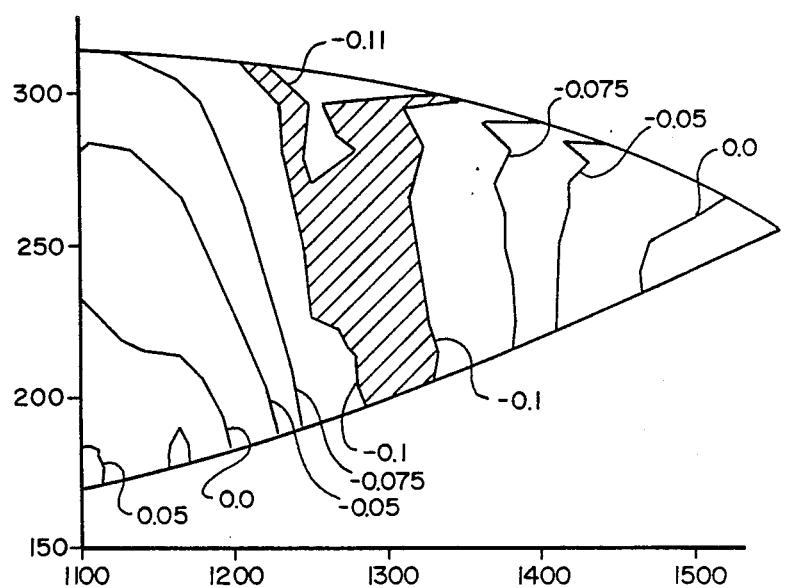
FIG. 2 is a representation of the side surface portion of the rear portion of an aircraft fuselage which closes in a conventional manner, with representations of isobars when no thrusting propeller is present.
Figure 3:
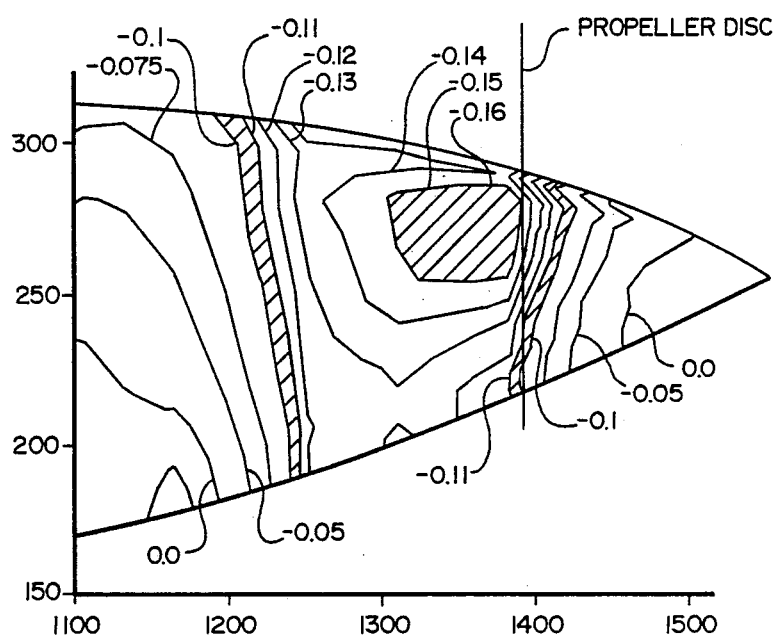
FIG. 3 is a view similar to FIG. 2, but showing the isobar pattern under circumstances where a thrusting propeller is present.

However, when a thrusting propeller is mounted adjacent to the aft body the pressure distribution can be undesirably disturbed, and this is illustrated in FIG. 3, which shows the same rear fuselage portion as FIG. 2 in side elevation, with a propeller being mounted at a location indicated as "propeller disc". It can be seen that there is initially a rather sharp pressure gradient a moderate distance forward of the propeller disc, and then a rather sharp pressure gradient rise immediately rearwardly of the propeller disc. These substantial fluctuations in the pressure along the surface of the aft body cause an undesirable thickening of the boundary layer with a consequent increase in drag. The present invention was conceived to alleviate this problem.

The airplane 10 of the present invention comprises a fuselage 12, a pair of wings 14 and a tail assembly 16 which is made up of a vertical fin 18 and a horizontal stabilizer 20. For purposes of description, the fuselage can be considered as having a forward portion 22, a main intermediate portion 24 and a rear portion 26. A pair of turboprop engines 28 are mounted by means of struts 30 on opposite sides of the rear portion 26 of the fuselage 12. Each engine 28 comprises a nacelle 31 and a pair of propellers 32.

The present invention is concerned primarily with the configuration of the rear fuselage portion 26 relative to the placement and operation of the engines 28, and more particularly the placement and operation of the propellers 32 of the engines 28. The forward and intermediate fuselage portions 24 and 26, the wings 14 and the tail assembly 16 are, or may be, in and of themselves conventional. Further, the turboprop engines 28, with regard to their basic configuration, construction and operation, are or may be conventional.

The intermediate main portion 24 of the fuselage 12 is, as shown herein, of a substantially uniform circular cross-sectional configuration, and for purposes of description can be considered as ending at a rear transition plane indicated at 34.

Figure 4:
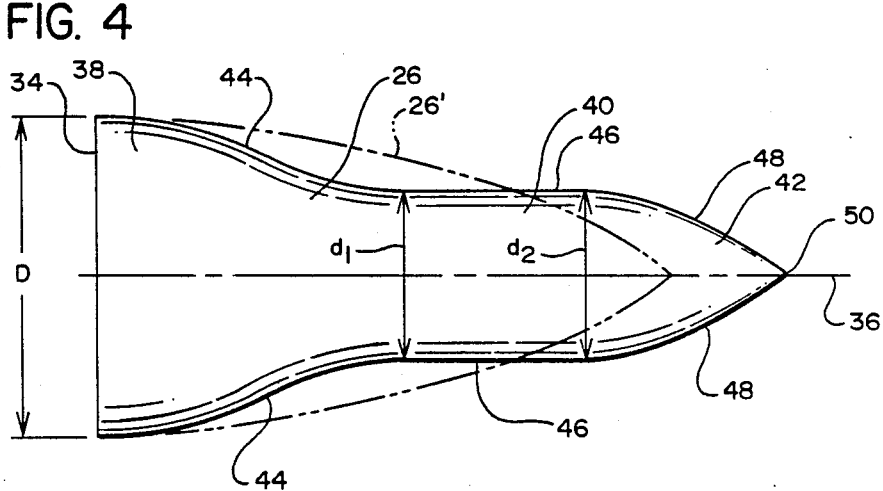
FIG. 4 is a schematic top plan view of a half section of the rear portion of the aircraft fuselage, showing in full lines a conventional side surface configuration and showing in broken lines a side surface configuration in accordance with the present invention.

In the present invention, the adverse consequences of the thrusting propeller changing the preferred pressure distribution pattern from the optimized pattern (see FIG. 2) to the less desirable pattern (see FIG. 3) is alleviated to at least some extent by contouring the surface area adjacent to the propellers 32. This will be described with reference to FIG. 4, which is a schematic top plan view showing the aft fuselage portion 26, and also showing at 26' a typical prior art aft body configuration, such as would exist in the 727 airplane. The aft fuselage portion 26 can be considered as having a forward section 38, an intermediate section 40 and an aft section 42.

The forward section 38 has two forward side surface regions 44 which slant inwardly and rearwardly. The intermediate section 40 has two intermediate side surface regions 46 which extend substantially parallel to the longitudinal center axis 36. The rear section 42 of the fuselage rear portions 26 has two side surface regions 48 which curve convexly toward a closure location 50.

To define the locations of the two side surface regions 44-48, it is first necessary to establish the "most adjacent surface location" which is that point on the intermediate surface region 46 which is closest to the outermost path portion followed by the outermost tip portion of the adjacent propeller 32. With the "most adjacent surface location" identified, we can now proceed with a definition of the side surface regions 44-48. The side surface regions 44-48 lie along a side surface center line which passes through the "most adjacent surface location" and extends forwardly and rearwardly therefrom along a path parallel to the stream tube which passes through the related propeller set 32. In the following discussion, for purposes of analysis, this stream tube of each propeller set 32 will be considered as having a constant cross sectional configuration, and being centered on the stream line which extends forwardly of that propeller set 32 and is centered on the propeller center axis 54, and also extends rearwardly from the location of the propeller 32 under flow conditions along the rear fuselage portion 42 when no propeller is present. In the configuration of the present invention, this propeller stream tube will slant in an inward and rearward direction in the vicinity of the forward side surface region 44, travel in a path which is more in alignment with the fuselage longitudinal axis 36 in the area of the intermediate side surface region 46, and then slant inwardly and rearwardly along the rear surface region 48. In the preferred configuration of the present invention, the two engines 28 do not extend directly laterally from the fuselage rear portion 26, but are mounted with the center axis of each engine 28 being positioned somewhat higher than the longitudinal center axis 36 of the fuselage 12.

As indicated previously, in the preferred configuration, the main intermediate fuselage portion 24 has a circular cross sectional configuration. The three sections 38, 40 and 42 of the rear fuselage portion 26 each have, at cross sectional locations along the longitudinal axis 36, substantially circular cross sectional configurations. The circular cross sectional configuration of the forward section 38 tapers radially inwardly in a rearward direction; the circular configuration of the intermediate section 40 has a substantially constant cross sectional circular configuration; and the circular cross sectional configuration of the rear section 42 tapers radially inwardly in a rearward direction.

With regard to the width dimensions of the side surface regions 44-48, the contouring is more critical in the area closely adjacent to the side surface center lines of the regions 44-48, and somewhat less significant as the surface area approaches the crown line at the uppermost and lowermost points of the fuselage. It has been found that since the flow field passing over the surface regions 44-48 is affected by the flow field entirely around the fuselage, the most benefit of the present invention can be obtained by contouring the fuselage aft portion 26 in accordance with the teachings of the present invention entirely around the fuselage aft section 26. Thus, in a broad sense, each side surface region 44-48 would extend from an upper fuselage crown line to a lower fuselage crown line. In a narrower sense, the more significant side surface regions would extend approximately half way from the side surface center line to the upper and lower crown lines.

Another consideration is the width dimensions in the aft body portion 26. Where the fuselage is circular in cross-sectional configuration along the length of the fuselage, then the width dimension can be considered as the diameter of the circular configuration. Where the fuselage 12 is not of a circular cross sectional configuration, the diameter can be considered as being equal to the diameter of an equivalent circle. This can be simply calculated as follows:

$$D = 2\frac{A}{\pi}$$

where A is the area for which the equivalent circle is being calculated.

There is the forward diameter D which is at the rear end of the main fuselage section 24. The diameter $d_1$ is at the forward end of the intermediate section 40 of the rear fuselage portion 26 and the diameter $d_2$ is at the rear end of the intermediate section 40. The ratio of the average of the diameters ($d_1$) and ($d_2$) of the intermediate section 40 to the diameter (D) at the rear end of the main fuselage portion 24 ($d_1/D$) is broadly between about 0.4 and 0.9, with a preferred range being between about 0.5 and 0.8, and with a preferred ratio being between 0.6 and 0.7.

With regard to the method of the present invention, an airplane can be designed in accordance with the teaching of the present invention as follows. First, an aft body section is designed to optimize the airflow over that aft body section, without a thrust propeller being present, and the pressure distribution pattern over that aft section is identified. As indicated previously, in many instances, the configuration of the aft body section will be close to an ogive shape.

Then the pressure distribution pattern over the aft fuselage section is analyzed when a thrusting propeller is positioned adjacent to the aft body section, and the resulting modified pressure distribution pattern is identified. This can be done by wind tunnel testing, by mathematical analysis, or a combination of the two. After this, the forward, intermediate and rear surface regions which are in the flow path adjacent to the propeller are recontoured from the original optimized shape to create pressure effects which counteract the adverse pressure effects created by the presence of the thrusting propeller, so as to return the pressure distribution pattern, as much as possible, to the original optimized pattern. The other surface areas on the aft fuselage portion are then contoured to optimize the overall flow pattern and also possibly accomodate other design considerations in the aircraft.

Figure 5:
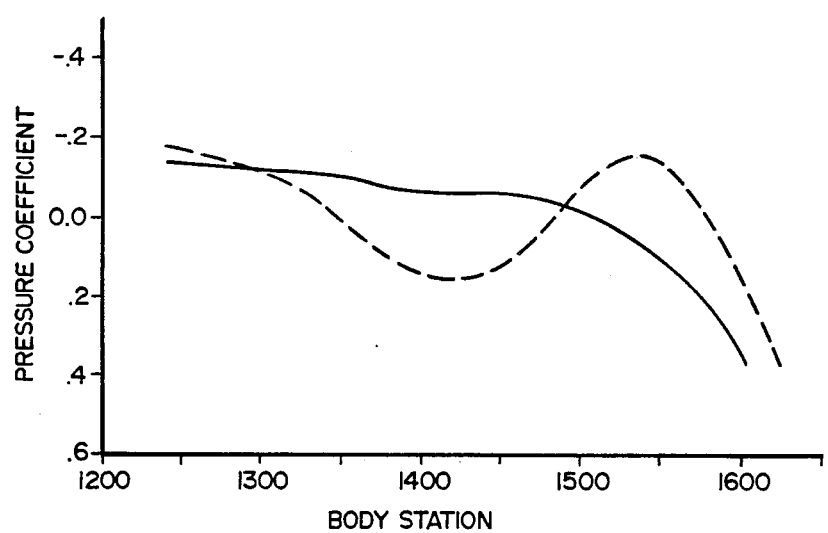
FIG. 5 is a graph illustrating certain pressure distribution patterns, showing in a whole line the pressure coefficient along the center line of the surface region of the aft body section adjacent to the propeller, and showing the modified pressure distribution achieved by contouring in accordance with the present invention, this being done to illustrate that the results of surface contouring in accordance with the present invention are to produce pressure effects which counteract the adverse effects of the thrusting propeller.

To illustrate how this is accomplished, reference is made to FIG. 5. There is shown in a solid line a pressure distribution curve of a conventionally curved aft fuselage section, with this curve approximating the pressure distribution pattern shown in FIG. 2. The pressure values are taken along the surface center line extending longitudinally through the location which is most adjacent to the outer path of the propeller blade. There is shown in broken lines the modified pressure distribution pattern which is achieved by contouring the side surface regions in accordance with the present invention, this being the pressure distribution curve when the propeller is absent. It can be seen by comparing the pressure curve of the modified contour of FIG. 5 with the pressure distribution pattern in FIG. 3 that the pressure effects of surface contouring largely counterbalance the pressure effects of the thrusting propeller, so that this would bring the resultant pressure distribution pattern back to a location closer to the optimized pressure distribution pattern.

While the invention has been described with reference to propellers that are unshrouded, it is to be understood that with the broader aspects, the present invention could be of value with propeller means in the form of a fan jet engine, or an engine where similar problems are encountered.

It is to be understood that various modifications could be made in the present invention without departing from the basic teachings thereof.

What is claimed is:

1. A method of designing an aircraft, where the aircraft comprises:
   (a) a fuselage having a longitudinal center axis, a forward portion, an intermediate main portion, and a rear portion,
   (b) first and second engines mounted adjacent to an exterior surface of said rear portion, said engines having first and second propeller means at first and second propeller locations, said propeller means being arranged to rotate about first and second propeller axes, respectively, with each propeller axis having a substantial alignment component parallel to said longitudinal axis,
   (c) said fuselage having first and second longitudinally extending surface portions which extend lengthwise along said rear fuselage portion and which are adjacent to said first and second propeller means, respectively, said method comprising:
   (a) establishing longitudinally extending reference contours for each surface portion, where each contour creates an optimized pressure distribution pattern over the side surface portions under conditions where the propeller means are absent,
   (b) identifying modified pressure distribution patterns over said surface portions, which modified pressure distribution patterns result from placing and operating the propeller means at said propeller locations to create thrust,
   (c) recontouring the side surface portions from the reference contours to actual contours to create pressure effects which counteract adverse pressure effects created by the thrusting propellers being present so as to bring the pressure distribution pattern over the side surface portions more closely to the optimized pattern, said actual contours of the side surface portions being characterized in that forward regions of the surface portions slant rearwardly and inwardly toward said longitudinal center axis at a relatively greater angle relative to said longitudinal axis and curve concavely to join their related intermediate regions which are more in alignment with said longitudinal center axis relative to their related forward surface regions, the intermediate regions joining to their related rear regions in a convex curve with each rear region slanting rearwardly and inwardly to a closure location.

2. The method as recited in claim 1, wherein said fuselage has a diameter dimension of an equivalent circle of a cross sectional area of said fuselage, and said fuselage is designed with a diameter dimension ratio which is the ratio of an average diameter value which is an average of the diameter dimensions at forward and rear end portions of said intermediate section, to the diameter dimension at the rear end of the intermediate fuselage section, said diameter dimension ratio being between about 0.4 and 0.9.

3. The method as recited in claim 2, wherein said diameter dimension ratio is between about 0.5 and 0.8.

4. The method as recited in claim 3, wherein said diameter dimension ratio is between about 0.6 and 0.7.

5. The method as recited in claim 4, wherein the side surface portions at the intermediate sections are substantially longitudinally aligned.

6. The method as recited in claim 3, wherein the side surface portions at the intermediate sections are substantially longitudinally aligned.

7. The method as recited in claim 3, wherein the side surface portions at the intermediate sections are substantially longitudinally aligned.

8. The method as recited in claim 2, wherein the side surface portions at the intermediate sections are substantially longitudinally aligned.

9. An aircraft made in accordance with the method recited in claim 1.

10. The aircraft as recited in claim 9, wherein said fuselage has a diameter dimension of an equivalent circle of a cross sectional area of said fuselage, and there is a diameter dimension ratio which is the ratio of an average diameter value which is an average of the diameter dimensions at forward and rear end portions of said intermediate section, to the diameter dimension at the rear end of the intermediate fuselage section, said diameter dimension ratio being between about 0.4 and 0.9.

11. The aircraft as recited in claim 10, wherein said diameter dimension ratio is between about 0.5 and 0.8.

12. The aircraft as recited in claim 11, wherein said diameter dimension ratio is between about 0.6 and 0.7.

13. The aircraft as recited in claim 9, wherein the side surface portions at the intermediate sections are substantially longitudinally aligned.

* * * * *